United States Patent
Fang

(10) Patent No.: US 10,567,947 B2
(45) Date of Patent: Feb. 18, 2020

(54) METHOD, APPARATUS, AND SERVER FOR NETWORK INQUIRY

(71) Applicant: GUANGZHOU UCWEB COMPUTER TECHNOLOGY CO., LTD., Guangzhou (CN)

(72) Inventor: Aiqiang Fang, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 98 days.

(21) Appl. No.: 15/874,209

(22) Filed: Jan. 18, 2018

(65) Prior Publication Data
US 2018/0206105 A1 Jul. 19, 2018

(30) Foreign Application Priority Data
Jan. 18, 2017 (CN) .......................... 2017 1 0041032

(51) Int. Cl.
| H04W 8/00 | (2009.01) |
| H04W 8/26 | (2009.01) |
| H04W 8/10 | (2009.01) |
| H04W 8/24 | (2009.01) |
| H04W 4/029 | (2018.01) |

(52) U.S. Cl.
CPC ........... *H04W 8/005* (2013.01); *H04W 4/029* (2018.02); *H04W 8/10* (2013.01); *H04W 8/245* (2013.01); *H04W 8/26* (2013.01)

(58) Field of Classification Search
CPC ....... H04W 8/005; H04W 8/245; H04W 8/10; H04W 8/26; H04W 64/003; H04W 4/02; H04W 4/029; H04W 84/12
See application file for complete search history.

(56) References Cited

U.S. PATENT DOCUMENTS

| 2006/0221917 A1* | 10/2006 | McRae | H04W 88/06 370/338 |
| 2013/0029692 A1* | 1/2013 | Liang | G06Q 30/02 455/456.3 |
| 2015/0189511 A1* | 7/2015 | Lapidous | H04W 12/12 726/15 |

* cited by examiner

*Primary Examiner* — Rina C Pancholi
(74) *Attorney, Agent, or Firm* — Anova Law Group, PLLC

(57) ABSTRACT

The present disclosure provides method, apparatus, and server for network inquiry. The method includes receiving location information sent by a client terminal and network information detected by the client terminal, searching for network information in a preset range stored in a database according to the location information, comparing the network information sent by the client terminal with the network information found through searching and identifying the network information found through searching based on a comparison result, and sending the identified network information to the client terminal.

15 Claims, 3 Drawing Sheets

METHOD, APPARATUS, AND SERVER FOR NETWORK INQUIRY

CROSS-REFERENCES TO RELATED APPLICATIONS

This application claims the priority of Chinese Patent Application No. CN201710041032.X, filed on Jan. 18, 2017, the entire content of which is incorporated herein by reference.

FIELD OF THE DISCLOSURE

The present disclosure generally relates to the field of network technology and, more particularly, relates to method, apparatus, and server for network inquiry.

BACKGROUND

With the continuous development of network technology, most public places, such as airports, railway stations, hotels, etc., can provide wireless network connection services. For example, Wi-Fi network connection service can be provided by deploying different Wi-Fi hotspots. It was found by inventors that, conventionally, when a client terminal inquiries about Wi-Fi networks, it generally searches for nearby available Wi-Fi networks using the location information sent by the client terminal. Using the above method, when different wireless access points (APs) use a same service set identifier (SSID) but different passwords, an inaccurate matching situation may occur, affecting user's correct use of the network.

BRIEF SUMMARY OF THE DISCLOSURE

The present disclosure provides a network inquiry method, applied to a server, the method including: receiving location information sent by a client terminal and network information detected by the client terminal; searching for network information in a preset range stored in a database according to the location information; comparing the network information sent by the client terminal with the network information found through searching, and identifying the network information found through searching based on the comparison result; and sending the identified network information to the client terminal.

The present disclosure also provides a network inquiry apparatus, applied to a server, the apparatus including: an information receiving module, configured to receive location information sent by a client terminal and network information detected by the client terminal; an information searching module, configured to search for network information in a preset range stored in a database according to the location information; a network identification module, configure to compare the network information sent by the client terminal with the network information found through searching, and identify the network information found through searching based on the comparison result; and an information sending module, configured to send the identified network information to the client terminal.

The present disclosure also provides a server. The server includes: a memory; a processor; and the above network inquiry apparatus installed/stored in the memory and executed by the processor.

The present disclosure also provides a non-transitory computer-readable storage medium containing computer-executable program instructions for, when executed by a processor, performing a network inquiry method. The method includes receiving location information sent by a client terminal and network information detected by the client terminal; searching for network information in a preset range stored in a database according to the location information; comparing the network information sent by the client terminal with the network information found through searching, and identifying the network information found through searching based on a comparison result; and sending identified network information to the client terminal.

Compared to existing technologies, by searching for network information in a preset range based on the location information sent by a client terminal, and then comparing the network information found through searching with the network information sent by the client terminal to identify the availability of the network, the network inquiry method, apparatus, and server of the present disclosure can effectively improve the accuracy of network identification and matching.

The above objects, features and advantages of the present disclosure will become more apparent through detailed illustration of various embodiments of the present disclosure with reference to the accompanying drawings.

BRIEF DESCRIPTION OF THE DRAWINGS

In order to describe the technical schemes of the embodiments of the present disclosure more clearly, the following briefly introduces the accompanying drawings required for describing the embodiments. It should be understood that the following drawings merely illustrate some embodiments of the present disclosure and therefore, shall not be regarded as to limit the scope of the present disclosure. For those skilled in the art, other related drawings may also be obtained based on these drawings without any creative work.

DETAILED DESCRIPTION

In the following, the technical schemes of the embodiments of the present disclosure are clearly and completely described with reference to the accompanying drawings. Apparently, the described embodiments are merely some but not all of the embodiments of the present disclosure. The components of the embodiments of the present disclosure, generally described and illustrated in the figures herein, may be arranged and designed in a wide variety of different configurations. Accordingly, the following detailed description of the embodiments provided in the accompanying drawings is not intended to limit the scope of the disclosure, but merely to illustrate selected embodiments of the disclosure. All other embodiments obtained by those skilled in the art based on the embodiments of the present disclosure without creative efforts shall fall within the protection scope of the present disclosure.

It should be noted that the same reference numbers and letters will be used throughout the accompanying drawings to refer to the same or like parts, and therefore, once a part is defined in a figure, the same or like part shall not need to be further defined in any subsequent figures. In the meantime, in the description of the present disclosure, the terms such as "first", "second", etc. are only used for distinguishing descriptions and cannot be understood as indicating or implying relative importance.

Figure 1:
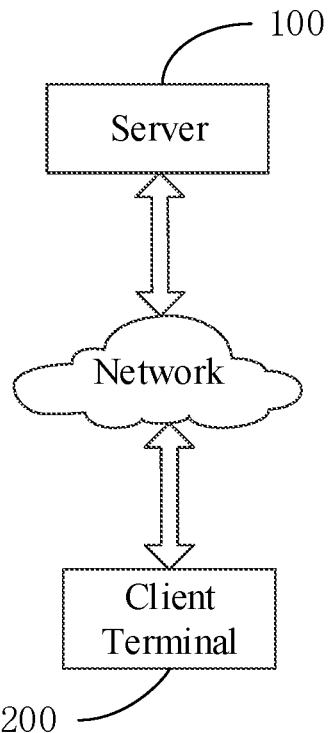
FIG. 1 illustrates a schematic diagram of exemplary interaction between a server and a client terminal consistent with various embodiments of the present disclosure.

FIG. 1 illustrates a schematic diagram of exemplary interaction between a server 100 and a client terminal 200 consistent with some various embodiments of the present disclosure. The server 100 communicates with one or more client terminals 200 through a network to realize data communication or interaction. In one embodiment, the server 100 may be a back-end service device that provides Internet access tools (such as DeerWiFi, 360WiFi, WiFi Master Key, etc.). The server 100 may be used to search for and provide nearby available network resources, such as Wi-Fi hotspots, etc. The server 100 may be able to provide the client terminal 200 free Internet access tools based on sharing economy. Accordingly, the client terminal 200 may be a mobile Internet device, such a mobile phone, a tablet computer, a notebook computer, or any other mobile device that is equipped with Internet access tools such as DeerWiFi, 360WiFi, WiFi Master Key, etc.

Figure 2:
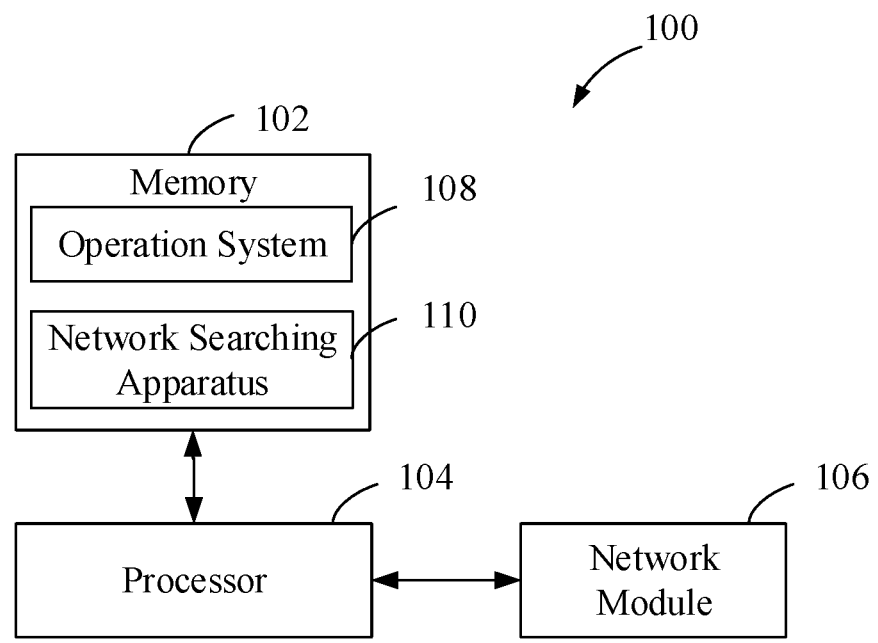
FIG. 2 illustrates a schematic block diagram of an exemplary server consistent with various embodiments of the present disclosure.

FIG. 2 illustrates a schematic block diagram of the exemplary server 100. The server 100 may include a network inquiry apparatus 110, a memory 102, a processor 104, and a network module 106. People with ordinary skill in the art should understand that the structure shown in FIG. 2 is merely illustrative and does not limit the structure of the server 100. For example, in other embodiments, the server may include more or fewer components than that shown in FIG. 2, or may have a different configuration from that shown in FIG. 2.

The memory 102 may be configured to store software programs and modules, such as the program instructions/modules corresponding to the network inquiry method and the apparatus according to the present disclosure. The processor 104 may execute various functional applications and data processing by executing the software programs and modules stored in the memory 102, and thus, the method described in the embodiments of the present disclosure may be implemented. The memory 102 may include high-speed random access memories, and may also include non-volatile memories such as one or more magnetic storage devices, flash memories, or other non-volatile solid-state memories. In some embodiments, the memory 102 may further include memories remotely disposed relative to the processor 104, and these remotely-disposed memories may be connected to the server 100 through a network. Examples of such networks include, but are not limited to, the Internet, intranet, local area network (LAN), mobile communications network, and their combinations.

The processor 104 may be an integrated circuit chip with signal processing capabilities. The processor 104 may be a general purpose processor, including central processing unit (CPU), network processor (NP), digital signal processor (DSP), application specific integrated circuit (ASIC), field programmable gate arrays (FPGAs), and other programmable logic device, discrete gate or transistor logic, discrete hardware component, etc. The general purpose processor may be able to implement the various methods, steps, and logic blocks according to the embodiments of the present disclosure. The general purpose processor may be a microprocessor, or may be any conventional processor or the like.

The network module 106 may be used to receive and transmit network signals. The network signals may include wireless and wired signals. In one embodiment, the network signals are wireless network signals. Accordingly, the network module 106 may include a plurality of components such as processors, random access memories, converters, crystal oscillators, etc.

The above software programs and modules may include an operating system 108 and a network inquiry apparatus 110. For example, the operation system 108 may be LINUX, UNIX, or WINDOWS. The operation system 108 may include various software components and/or drivers for managing system tasks (e.g., memory management, storage device control, power management, etc.) and may also be able to communicate with various hardware or software components to provide an operating environment for other software components. The network inquiry apparatus 110 may be operated based on the operating system 108, and may be configured to receive request sent by the client terminal 200 and search for networks in a preset range based on the request.

Figure 3:
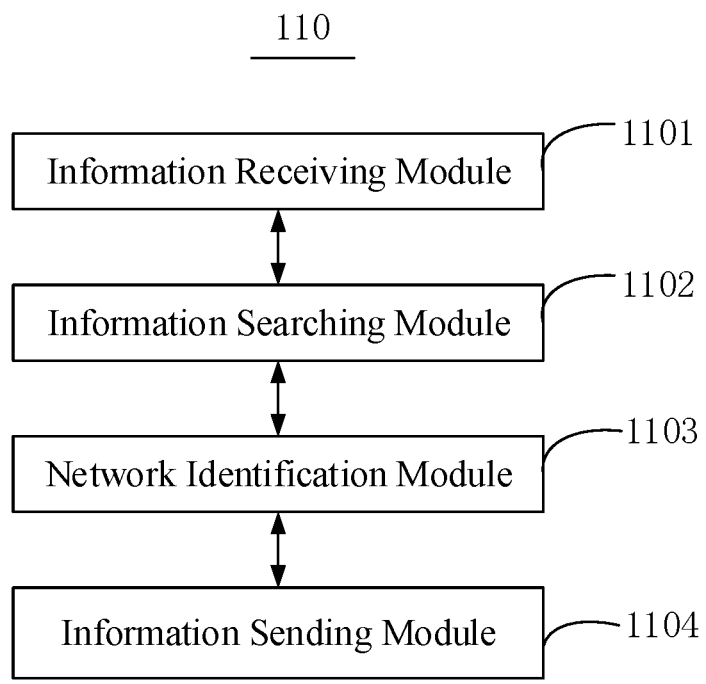
FIG. 3 illustrates a schematic diagram of functional modules of a network inquiry apparatus for an exemplary network inquiry method consistent with various embodiments of the present disclosure.
Figure 4:
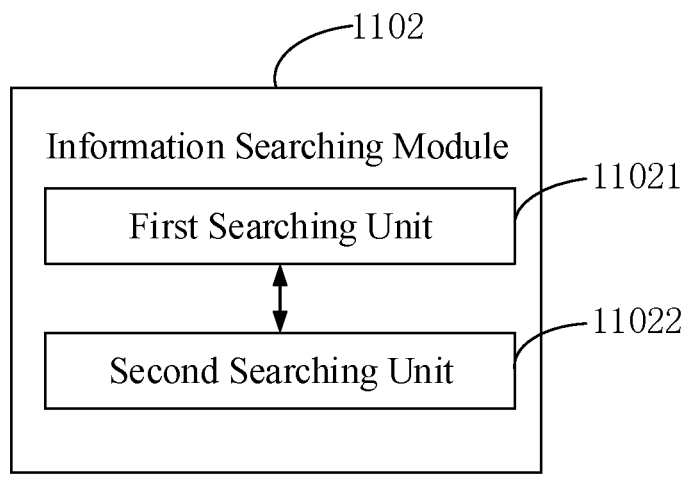
FIG. 4 illustrates a schematic diagram of functional units of an information searching module for an exemplary network inquiry method consistent with various embodiments of the present disclosure.

FIG. 3 illustrates a schematic diagram of the functional modules of a network inquiry apparatus 110 for an exemplary network inquiry method consistent with some various embodiments of the present disclosure. Referring to FIG. 3, the network inquiry apparatus 110 may include an information receiving module 1101, an information searching module 1102, a network identification module 1103, and an information sending module 1104. Among them, as shown in FIG. 4, the information searching module 1102 may include a first searching unit 11021 and a second searching unit 11022.

In the following, the functional modules included in the network inquiry apparatus 110 will be described in detail with reference to various embodiments of the disclosed network inquiry method.

Figure 5:
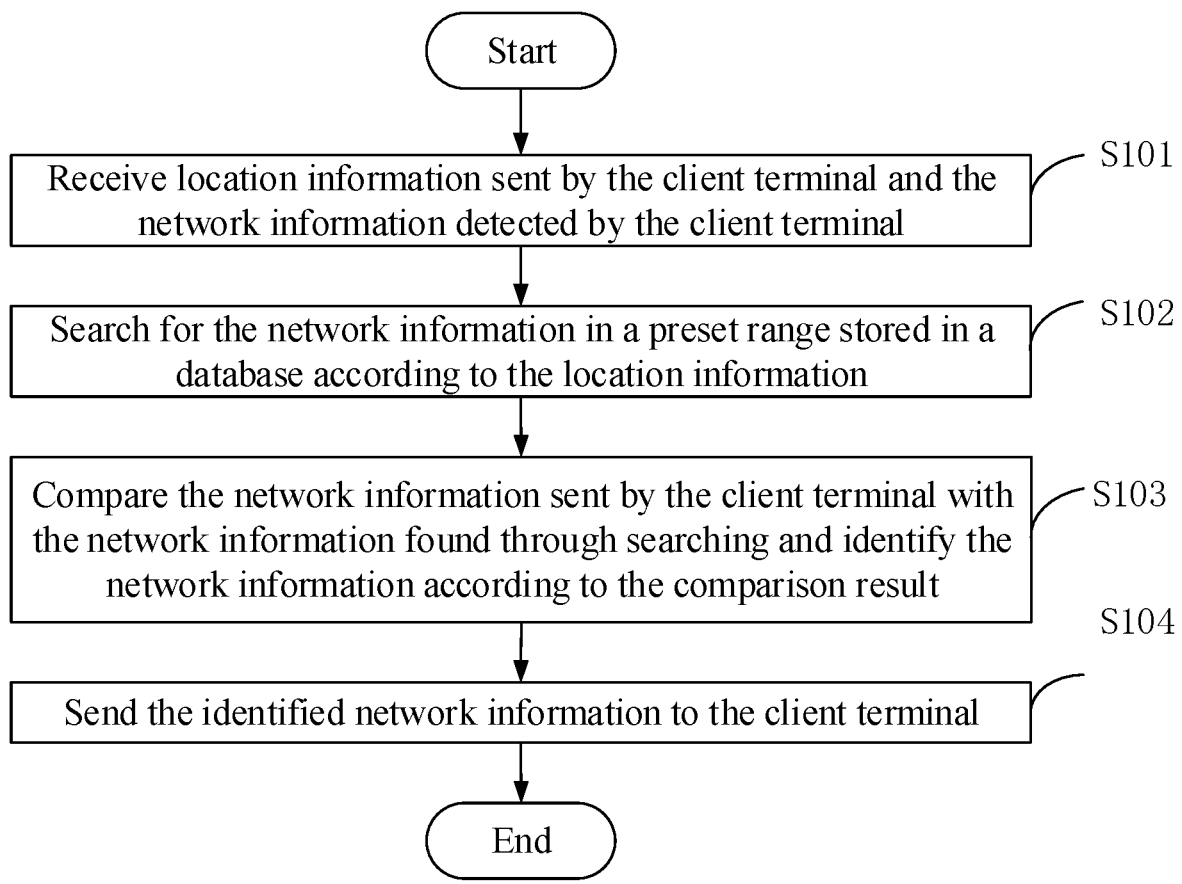
FIG. 5 illustrates a schematic flowchart of an exemplary network inquiry method consistent with various embodiments of the present disclosure.

FIG. 5 illustrates a schematic flowchart of a network inquiry method applied to the server 100 shown in FIG. 2 according to some various embodiments of the present disclosure. The details of the specific process flow shown in FIG. 5 will be described below.

In Step S101, the server may receive the location information sent by the client terminal and the network information detected by the client terminal. In a certain embodiment, the process described in Step S101 may be executed and implemented by the information receiving module 1101.

In one embodiment, the location information sent by the client terminal to the server may include a positioning mode of the client terminal and a device location. The device location may include the longitude, the latitude, the altitude, and other parameters of the location where the client terminal is located.

In one embodiment, the network information sent by the client terminal and received by the server may include a basic service set identifier (BSSID) and a service set identifier (SSID). Among them, the BSSID may represent a Media Access Control (MAC) address of a wireless access point in a physical environment of a network. The MAC address may be used to uniquely identify a network card in the network. The SSID can be understood as a network name used to identify the network. The SSID can use up to 32 characters to identify a network.

In Step S102, the server may search for the network information in a preset range stored in a database according to the location information. In a certain embodiment, the process described in Step S102 may be executed and implemented by the information searching module 1102.

In one embodiment, the network corresponding to the network information may be a wireless network, e.g. a Wi-Fi hotspot. The network information may include a BSSID, an SSID, a network location, a network encryption method, a network password, and other information of the wireless network. Of course, the network information may also include the network IP address, the network operator, and the location area of the network found through searching. The network information may be used to uniquely identify the local network environment of the network found by the server.

In one embodiment, the positioning mode of the location information may include a mobile network positioning mode, a global positioning system (GPS) positioning mode, or a Wi-Fi network positioning mode.

In one embodiment, based on the difference in the positioning modes, the detailed implementation methods for Step S102 may include the following two types.

First, when the positioning mode is a GPS positioning mode or a Wi-Fi network positioning mode, the network information in a first preset range stored in the database may be searched. In a certain embodiment, the process described in the above step may be executed and implemented by the first searching unit 11021. The positioning accuracy of the GPS positioning mode or the Wi-Fi network positioning mode is high such that the search range of the server can be set to be relatively small. Therefore, the search volume of the server may be reduced, which may save network resources. In one embodiment, the server may search for wireless networks stored in the database within a hundred meters of the current location of the client terminal.

Second, when the positioning mode is the mobile network positioning mode, the network information in a second preset range stored in the database may be searched. The first preset range may be smaller than the second preset range. In a certain embodiment, the process described in the above step may be executed and implemented by the second searching unit 11022. Since the positioning accuracy of the mobile data positioning mode may not be high, accordingly, the search range of the server can be set to be relatively large. As such, the probability for the server to find networks in the vicinity of the location of the client terminal may be improved. In one embodiment, the server may search for wireless networks stored in the database within five hundred meters of the current location of the client terminal.

In Step S103, the network information sent by the client terminal may be compared to the network information found through searching, and the network information found through searching may be identified according to the comparison result. In a certain embodiment, the process described in Step S103 may be executed and implemented by the network identification module 1103.

In one embodiment, the implementation method of Step S103 may be as follows.

First, the BSSID and the SSID sent by the client terminal may be compared with the BSSID and the SSID of the network found through searching, respectively. When the SSID and the BSSID sent by the client terminal match with the SSID and the BSSID of the network found through searching, respectively, i.e., when the SSID sent by the client terminal is the same as the SSID found through searching and the BSSID sent by the client terminal is also the same as the BSSID found through searching, the server may identify the network information found through searching as an available network. In one embodiment, a SSID may be understood as a name of a wireless network, and a BSSID may be understood as a MAC address of a wireless access point corresponding to a physical environment that the wireless network is located in. Because the MAC address and the network name of a wireless network can uniquely identify the wireless network, when both the SSID and the BSSID sent by the client terminal match with the BSSID and the SSID of the network found through searching, respectively, it can be determined that the network detected by the client terminal and the network found by the server are the same network. Although different users may use a same network name, the network name can be understood as referring to different networks for different users. Therefore, a SSID and a BSSID can be used to uniquely identify an available network, which may improve the accuracy of the available network returned to the client terminal by the server, and improve the degree of network matching.

Secondly, when the BSSID sent by the client terminal is different from the BSSID of the network found through searching, but the SSID sent by the client terminal is the same as the SSID of the network found through searching, the network information found through searching may be identified as a potential available network.

Moreover, when the BSSID and the SSID sent by the client terminal are both different from the BSSID and the SSID found through searching, respectively, the network information found through searching may be identified as an unavailable network. In addition, the server may further send an error code corresponding to the unavailable network to the client terminal. The error code may include a cause of the error, etc. For example, the cause of the error may be that the network information sent by the client terminal is not within a preset range corresponding to the location information, or may be that the SSID of the network information sent by the client terminal is different from the SSID of the network information found through searching.

In Step S104, the identified network information may be sent to the client terminal.

In one embodiment, when the network corresponding to the network information sent to the client terminal is an encrypted network, the network information may further include the BSSID, the SSID, the network location, the network encryption method, and the network password.

In one embodiment, after the client terminal receives the identified network information, the client terminal may display the network name and the prompt string of the available network, or display the network name of the potentially available network or the unavailable network. In one embodiment, the prompt string is displayed below the network name of an available network. For example, the prompt string may be a sign of "Master key, one-touch Wi-Fi connection". Of course, in other embodiments, the prompt string may be texts or symbols of other prompt classes.

According to the method and the apparatus for network inquiry, and the server equipped with the apparatus for network inquiry described in the above embodiments, the network information in a preset range is searched based on the location information sent by the client terminal, and the network information found through searching is compared with the network information sent by the client terminal to identify the availability of the network. As such, the accuracy of network identification and matching can be effectively improved.

It should be understood that the disclosed apparatus and method according to various embodiments of the present disclosure may also be implemented in other manners. Therefore, the embodiments of the disclosed apparatus described above are merely exemplary. For example, the flowcharts and the block diagrams in the drawings show some possible architectures, functions, and operations that can be implemented based on the apparatuses, the methods, and the computer program products of various embodiments of the present disclosure. In this regard, each block of the flowcharts or the block diagrams may represent a module, a section of a program, or a portion of a code that includes one or more executable instructions for implementing specified logic functions. It should also be noted that in some alternative implementations, the functions described in the blocks may occur in an order different from the order described in the accompanying drawings. For example, two consecutive blocks may in fact be executed substantially in parallel, or in some cases, they may even be executed in the reverse order, depending on the functions involved. It is also to be noted that each block of the block diagrams and/or flowchart illustrations, and combinations of blocks in the block diagrams and/or flowchart illustrations, can be implemented by special purpose hardware-based systems that perform the specified functions or operations, or may be implemented using a combination of dedicated hardware and computer instructions.

In addition, the functional modules according to various embodiments of the present disclosure may be integrated together to form an independent part, or each of the functional modules may exist separately, or two or more functional modules may be integrated to form an independent part.

When the function is implemented in the form of software function modules and is sold or used as an independent product, the function may be stored in a computer-readable storage medium. Based on this understanding, the essential technical scheme of the present disclosure, the part of the present disclosure that contributes to the existing technology, or a portion of the technical scheme may be embodied in the form of a software product. The computer software product may be stored in a storage medium and may include a plurality of instructions used to control a computer device (e.g. a personal computer, a server, a network device, etc.) to execute all or part of the steps of the method according to various embodiments of the present disclosure. The storage medium may include various media that are capable of storing program code, such as USB flash disks, removable hard disks, read-only memories (ROM), random access memories (RAM), magnetic disks, or optical disks. It should be noted that, in this disclosure, relational terms such as "first" and "second" are merely used to distinguish one entity or operation from another entity or operation, and do not necessarily require or imply the actual existence of such a relation or an order between the entities or the operations. Moreover, the terms "include," "including," or any other variations thereof are intended to cover a non-exclusive inclusion such that a process, method, object, or apparatus that includes a list of elements not only includes those elements but also includes other elements that are not listed explicitly or other elements that are inherent to such process, method, object, or device. Without further limitations, an element limited by the statement "including a . . . " does not exclude the existence of additional identical elements in the process, method, object, or apparatus that includes the element.

The above descriptions are merely some embodiments of the present disclosure and are not intended to limit the scope of the present disclosure. For those skilled in the art, the present disclosure may have various modifications and changes. Within the spirit and principle of the present disclosure, any modification, equivalent replacement, improvement, etc. should be included in the protection scope of the present disclosure. It should be noted that the same reference numbers and letters are used throughout the accompanying drawings to refer to the same or like parts, and therefore, once a part is defined in a figure, the same or like part shall not need to be further defined in any subsequent figures.

The above descriptions are merely specific embodiments of the present disclosure, but the protection scope of the present disclosure is not limited thereto. Within the technical scope disclosed in the present disclosure, all changes and substitutions that those skilled in the art may easily conceive should be covered by the protection scope of the present disclosure. Therefore, the protection scope of the present disclosure should be subject to the protection scope of the claims.

What is claimed is:

1. A network inquiry method, applied to a server, comprising:

receiving location information sent by a client terminal and network information detected by the client terminal, wherein the location information includes a positioning mode of the client terminal and a device location, and the positioning mode is a mobile network positioning mode, a global positioning system (GPS) positioning mode, or a Wi-Fi network positioning mode;

searching for network information in a preset range stored in a database according to the location information, including:

searching for the network information in a first preset range stored in the database when the positioning mode is the GPS positioning mode or the Wi-Fi network positioning mode, and searching for the network information in a second preset range stored in the database when the positioning mode is the mobile network positioning mode, wherein the first preset range is smaller than the second preset range;

comparing the network information sent by the client terminal with the network information found through searching, and identifying the network information found through searching based on a comparison result; and sending identified network information to the client terminal.

2. The network inquiry method according to claim 1, wherein the received network information sent by the client terminal includes a basic service set identifier (BSSID) and a service set identifier (SSID).

3. The network inquiry method according to claim 2, wherein comparing the network information sent by the client terminal with the network information found through searching, and identifying the network information found through searching based on the comparison result include:

comparing the BSSID and the SSID sent by the client terminal with a BSSID and a SSID found through searching, respectively; and when the BSSID and the SSID sent by the client terminal are same as the BSSID and the SSID found through searching, respectively, identifying the network information found through searching as an available network.

4. The network inquiry method according to claim 3, wherein comparing the network information sent by the client terminal with the network information found through searching, and identifying the network information found through searching based on the comparison result further include:
when the B SSID sent by the client terminal are different from the BSSID found through searching but the SSID sent by the client terminal is same as the SSID found through searching, identifying the network information found through searching as a potential available network; and
when the BSSID and the SSID sent by the client terminal are both different from the BSSID and the SSID found through searching, identifying the network information found through searching as an unavailable network.

5. The network inquiry method according to claim 1, wherein when a network corresponding to the network information sent to the client terminal is an encrypted network, the network information sent to the client terminal includes a BSSID, a SSID, a network location, a network encryption method, and a network password.

6. A server, comprising:
a memory, configured to store program instructions;
a processor, coupled with the memory and, when the program instructions being executed, configured to:
receive location information sent by a client terminal and network information detected by the client terminal, wherein the location information includes a positioning mode of the client terminal and a device location, and the positioning mode is a mobile network positioning mode, a global positioning system (GPS) positioning mode, or a Wi-Fi network positioning mode;
search for network information in a preset range stored in a database according to the location information, by performing:
searching for the network information in a first preset range stored in the database when the positioning mode is the GPS positioning mode or the Wi-Fi network positioning mode, and searching for the network information in a second preset range stored in the database when the positioning mode is the mobile network positioning mode; wherein the first preset range is smaller than the second preset range;
compare the network information sent by the client terminal with the network information found through searching, and identify the network information found through searching based on a comparison result; and
send identified network information to the client terminal.

7. The server according to claim 6, wherein the received network information sent by the client terminal includes a basic service set identifier (BSSID) and a service set identifier (SSID).

8. The server according to claim 7, wherein the processor is further configured to:
compare the BSSID and the SSID sent by the client terminal with a BSSID and a SSID found through searching, respectively; and
when the BSSID and the SSID sent by the client terminal are same as the BSSID and the SSID found through searching, respectively, identify the network information found through searching as an available network.

9. The server according to claim 8, wherein:
when the B SSID sent by the client terminal is different from the BSSID found through searching and the SSID sent by the client terminal is same as the SSID found through searching, the processor is further configured to identify the network information found through searching as a potential available network; and
when the BSSID and the SSID sent by the client terminal are both different from the BSSID and the SSID found through searching, the processor is further configured to identify the network information found through searching as an unavailable network.

10. The server according to claim 6, wherein when a network corresponding to the network information sent to the client terminal is an encrypted network, the network information sent to the client terminal includes a BSSID, a SSID, a network location, a network encryption method, and a network password.

11. A non-transitory computer-readable storage medium containing computer-executable program instructions for, when executed by a processor, performing a network inquiry method, the method comprising:
receiving location information sent by a client terminal and network information detected by the client terminal, wherein the location information includes a positioning mode of the client terminal and a device location, and the positioning mode is a mobile network positioning mode, a global positioning system (OPS) positioning mode, or a Wi-Fi network positioning mode;
searching for network information in a preset range stored in a database according to the location information, including:
searching for the network information in a first preset range stored in the database when the positioning mode is the GPS positioning mode or the Wi-Fi network positioning mode, and searching for the network information in a second preset range stored in the database when the positioning mode is the mobile network positioning mode, wherein the first preset range is smaller than the second preset range;
comparing the network information sent by the client terminal with the network information found through searching, and identifying the network information found through searching based on a comparison result; and
sending identified network information to the client terminal.

12. The non-transitory computer-readable storage medium according to claim 11, wherein the received network information sent by the client terminal includes a basic service set identifier (BSSID) and a service set identifier (SSID).

13. The non-transitory computer-readable storage medium according to claim 12, wherein comparing the network information sent by the client terminal with the network information found through searching, and identifying the network information found through searching based on the comparison result include:
comparing the BSSID and the SSID sent by the client terminal with a BSSID and a SSID found through searching, respectively; and
when the BSSID and the SSID sent by the client terminal are same as the BSSID and the SSID found through searching, respectively, identifying the network information found through searching as an available network.

14. The non-transitory computer-readable storage medium according to claim 13, wherein comparing the network information sent by the client terminal with the network information found through searching, and identifying the network information found through searching based on the comparison result further include:
  when the B SSID sent by the client terminal are different from the B SSID found through searching but the SSID sent by the client terminal is same as the SSID found through searching, identifying the network information found through searching as a potential available network; and
  when the BSSID and the SSID sent by the client terminal are both different from the BSSID and the SSID found through searching, identifying the network information found through searching as an unavailable network.

15. The non-transitory computer-readable storage medium according to claim 11, wherein when a network corresponding to the network information sent to the client terminal is an encrypted network, the network information sent to the client terminal includes a BSSID, a SSID, a network location, a network encryption method, and a network password.

* * * * *